No. 856,880. PATENTED JUNE 11, 1907.
L. & J. JACKSON.
SPRING WHEEL FOR MOTOR CARS AND OTHER VEHICLES.
APPLICATION FILED MAR. 10, 1906.
2 SHEETS—SHEET 2.
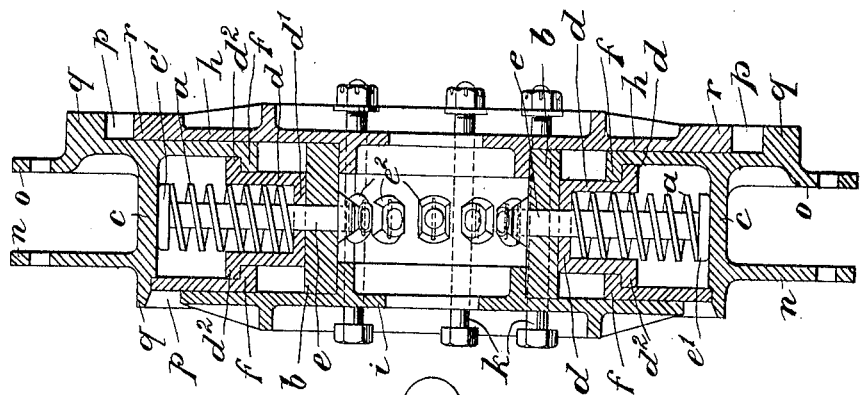
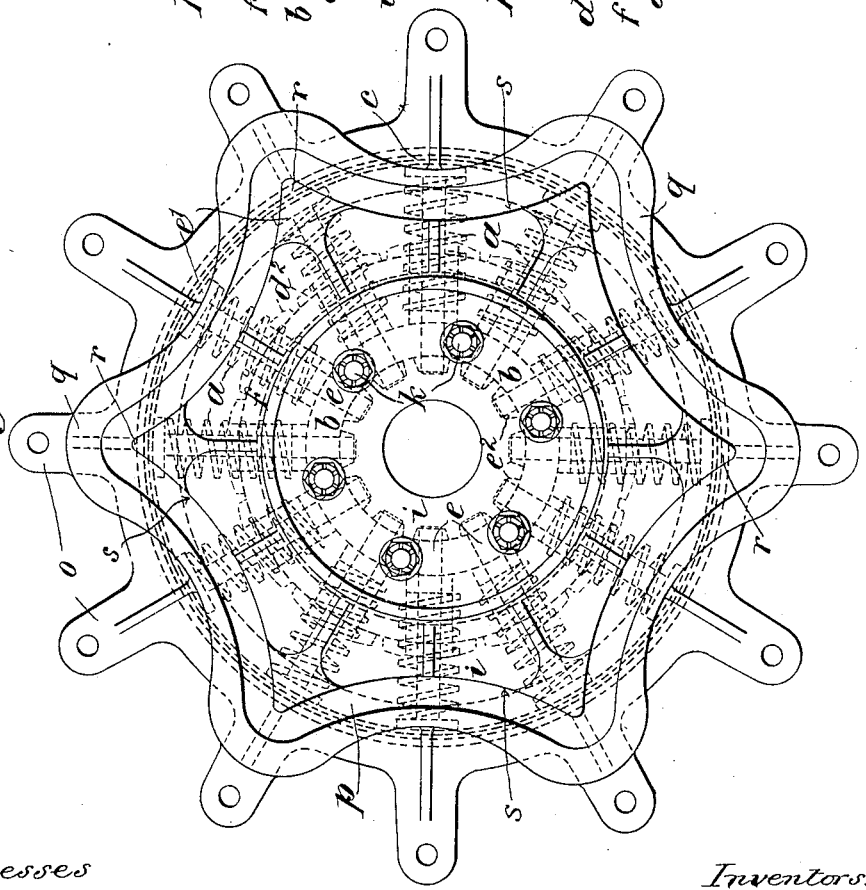
Witnesses
Inventors.

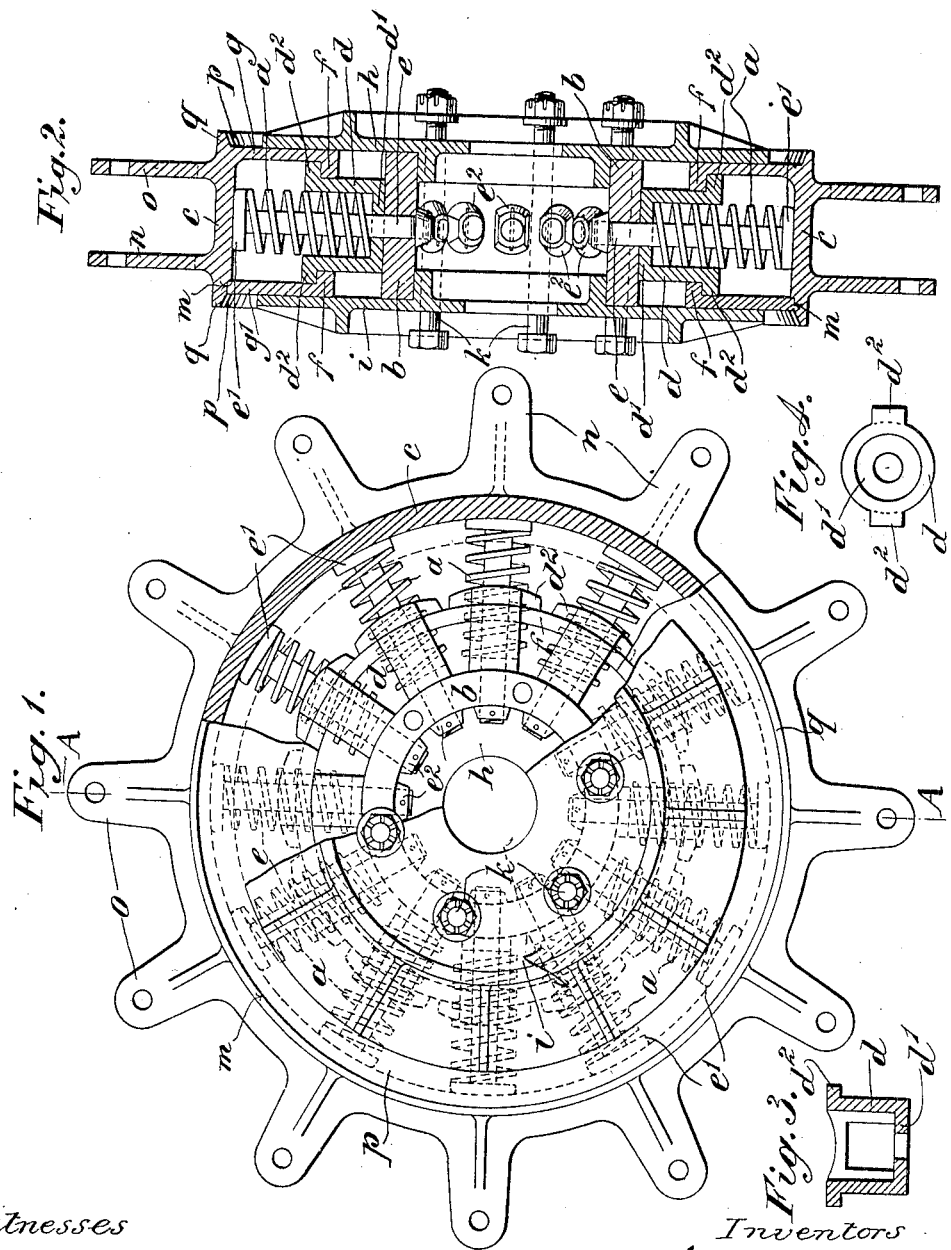

UNITED STATES PATENT OFFICE.

LOFTUS JACKSON AND JOHN JACKSON, OF LONDON, ENGLAND, ASSIGNORS TO THEMSELVES AND THE RESILIENT HUB (JACKSON'S FOREIGN PATENTS) SYNDICATE LIMITED, OF LONDON, ENGLAND.

SPRING-WHEEL FOR MOTOR-CARS AND OTHER VEHICLES.

No. 856,880.     Specification of Letters Patent.     Patented June 11, 1907.

Application filed March 10, 1906. Serial No. 305,403.

*To all whom it may concern:*

Be it known that we, LOFTUS JACKSON and JOHN JACKSON, subjects of the King of Great Britain and Ireland, residing, respectively, at London, England, have invented Improvements in Spring-Wheels Suitable for Motor-Cars and other Vehicles, of which the following is a specification.

This invention has reference to spring wheels of the kind suitable for motor cars and other vehicles wherein coiled springs are arranged radially between two rings arranged one inside the other, as in wheels constructed according to British Letters Patent No. 10991 of 1902; and Nos. 5875 and 24709 of 1903, granted to one of us, viz. the said John Jackson, and it has for object to provide a wheel of this kind in which a greater number of the springs than usual in such wheels shall be brought into action when the wheel is in use, so as to provide a large amount of resiliency, and whereby the springs can be inserted in place without being normally put under compression so that they can be easily and cheaply constructed and their life prolonged. For this purpose in a spring wheel according to this invention, the radially arranged coiled springs are held between devices (hereinafter called spring holders) that are arranged between and normally bear against the two rings of rigid material between which the springs are to act and are so connected to the respective rings that when the wheel is in use and the two rings are moved radially relatively to each other under the action of a load and by reason of the resiliency of the springs, not only will springs that are, for the time being, at the lower part of the wheel be subject to compression, due to the relative radial displacement of the rings, but also springs at the upper part of the wheel will, from the same cause, be subject to compression. In the earlier wheels to which reference is made above, compression of the springs above the axis of the wheel acted in the reverse direction to compression of the springs below the axis as regards supporting the load. By the improved arrangement a greater number of the springs than heretofore usual in the earlier wheels will be brought into action to support the load, whereby greater resiliency will be provided and a very easy running wheel obtained, while at the same time the coiled springs can be put in place in their normal or uncompressed or practically uncompressed condition. The springs may however, if desired, be put under some compression, but this will usually be unnecessary and undesirable.

An important advantage of my improved arrangement is that the parts of the wheel are free to adjust themselves in action without overstrain.

The springs holders and rings can be constructed in various forms to enable the above mentioned results to be attained.

Conveniently, each radially arranged coiled spring is placed in a separate cylinder so as to bear at its inner end against the closed inner end of the cylinder, its outer end being arranged to bear against a head, collar or enlargement (hereinafter called the head) of a spindle that extends axially inward through the coiled spring, the inner end of the cylinder and the inner of the two rings and is provided at its inner end with a stop, such as a nut, adapted to bear against the inner surface of the said inner ring and limit the outward movement of the spindle and head while leaving the said spindle free to move radially inward through the inner ring under the pressure of the outer ring on its head. The inner end of each spring cylinder normally bears against the outer surface of the inner ring. The outer end of each spring cylinder is adapted to be engaged with the outer ring in such a way that the portion of such ring with which the cylinder is engaged is free to move radially inward from its normal position relatively to the inner ring independently of the cylinder, but will engage the said cylinder and move it radially outward when the said part of the ring moves radially outward from its normal position and then compress the corresponding spring between the outwardly moving bottom of the cylinder and the head of the spindle which is then held stationary in a radial direction by reason of the abutment of the nut or other stop on the spindle against the inner surface of the inner ring.

The arrangement is such that when the wheel is rotating on the ground and is subject to load, the inner ring will be displaced in a downward direction relatively to the outer ring with the result that springs in the lower portion of the wheel will be compressed between the heads of the spindles, then bearing against the lower portion of the inner surface of the outer ring, and the spring cylinders which will be forced in a downward and radially outward direction by the inner ring acting upon their closed inner ends, while springs in the upper portion of the wheel will be compressed between the heads of the spindles, which are moved downward by the nuts or stops on the spindles bearing against the upper portion of the inner surface of the inner ring, and the bottoms of the corresponding cylinders which will be held in position by the engagement of the outer ring with the outer ends of the cylinders.

Conveniently the outer end of each spring cylinder may be flanged laterally and be arranged to engage with corresponding lateral flanges on side rings on the outer ring which may be divided in a direction transverse to the axis of the ring or be otherwise constructed to admit of the spring cylinders being easily arranged within and between the two sides thereof. This mode of connection between the spring holders and the outer ring is an important feature in securing the requisite freedom of adjustment, but the precise form of the parts, as for instance, whether the spring holders are cylindrical or open-sided is not material.

The rings with interposed springs and spring holders may be arranged at the hub or central portion of a wheel, or near the outer periphery thereof, the outer ring in the one case, or the inner ring in the other, being suitably formed for the reception of wheel spokes or their equivalent.

For transmitting rotary motion from the inner ring to the outer one, in the case of a driving wheel, the inner ring may be provided at one side, or at each side, with a driving plate formed with outwardly extending lugs or projections loosely engaging corresponding recesses formed in the corresponding side of the outer ring, or other equivalent driving means which do not interfere with the requisite freedom of adjustment may be employed.

In the accompanying illustrative drawings, Figure 1 is a side elevation, and Fig. 2 a cross section on the line A A of Fig. 1, showing the hub portion of one construction of spring wheel according to this invention, portions of the wheel being broken away in Fig. 1 for convenience of illustration. Figs. 3 and 4 show an open-sided spring holder in end elevation and plan respectively. Figs. 5 and 6 are similar views to Figs. 1 and 2 respectively showing a wheel according to this invention adapted as a driving wheel.

In Figs. 1 to 4 inclusive, which show a free or non-driven wheel, $a$ are the radially arranged coiled springs placed between inner and outer rings $b$ and $c$ respectively to constitute the hub portion of a spring wheel Each spring according to this invention is placed in a separate holder $d$, so as to bear at its inner end against the inner end $d^1$ of the holder, its outer end bearing against the head $e^1$ of a spindle $e$ that extends inward through the coiled spring $a$, the inner end $d^1$ of the holder, and the inner ring $b$ and is provided at its inner end with a stop $e^2$, shown as a nut, that is adapted to bear against the inner surface of the ring $b$. This stop serves to limit the outward movement of the spindle $e$ and to cause the spindle to move radially inward with the ring $b$, while leaving the said spindle free to move radially inward through the said ring $b$ under the pressure of the outer ring $c$ on its head $e^1$. The inner end $d^1$ of each spring holder $d$ normally bears against the outer surface of the inner ring $b$. The outer end of each spring holder $d$ is flanged at $d^2$ to adapt it to engage with annular flanges $f, f$ formed on the inner surfaces of side rings $g, g^1$ that are connected to the outer ring $c$ so as in effect to form part thereof, the arrangement being such that the portions of the flanges $f, f$ with which the flanges $d^2$ on the holder $d$ engage are free to move radially inward from their normal position, relatively to the inner ring $b$, independently of the holder $d$, and that when the said portions of the flanges $f f$ move radially outward from their normal position, relatively to the inner ring $b$, they will engage the flanges $d^2$ and move the holder $d$ radially outward so as to compress the corresponding spring $a$ between the outwardly moving inner end $d^1$ of the holder and the head $e^1$ of the corresponding spindle $e$ which is then held stationary, in a radial direction, by reason of the abutment of the stop $e^2$ thereon against the inner surface of the ring $b$.

The operation of the arrangement is as follows:—When the wheel, of which the spring hub described forms a part, is rotating on the ground and is subject to load, the inner ring $b$ will be displaced in a downward direction relatively to the outer ring $c$ with the result that springs $a$ that are, for the time being, in the lower portion of the hub will be compressed between the heads $e^1$ of the spindles $e$, then bearing against the lower portion of the inner surface of the outer ring $c$, and the inner ends $d^1$ of the corresponding spring holders $d$ which will be forced in a downward and radially outward direction by the action thereon of the inner ring $b$, while springs $a$ that are, for the time being, in the upper portion of the hub will be compressed between the heads $e^1$ of the spindles $e$, moved downward by the nuts $e^2$ on the spindles bearing against the inner surface of the upper portion of the inner ring $b$, and the inner ends $d^1$ of the corresponding holders $d$ which will be held by the engagement of the flanges $f$ on the side rings $g$, $g^1$ of the outer ring $c$ with the flanges $d^2$ on the outer ends of the holders $d$. The flanges $d^2$ of the holders $d$ are free to slide upon the flanges $f$ of the side rings $g$, and the heads $e^1$ of the spindles $e$ are also free to slide upon the inner surface of the outer ring $c$. It will thus be seen that with the above construction, all the parts of the wheel are free to automatically adjust themselves in action without bringing any hurtful strain upon the springs $a$, or spindles $e$, or holders $d$. In the case of a free wheel, such as shown in Figs. 1 and 2, the extent of freedom of the parts to slide one over the other is unlimited. In the case of a driving wheel, such as hereinafter described with reference to Figs. 5 and 6, the parts are free to slide upon one another as in Figs. 1 and 2, the amount of motion being only limited by the extent of circular motion permitted between the driving and driven parts of the wheel. When the wheel receives a sudden shock, due to running over an obstacle in the road, and moves upward relatively to the inner ring $b$, spindles $e$ in the lower part of the hub will be forced upward and radially inward by the outer ring $c$ through the inner ring $b$ so as to compress the corresponding springs $a$ between the inwardly moving heads $e^1$ of the spindles and the inner ends $d^1$ of the holders $d$, which will then bear against the lower portion of the outer surface of the inner ring $b$, while spindles $e$ in the upper part of the hub will be held radially by the inner ring $b$ through the stops $e^2$, so that the corresponding springs $a$ will be compressed between the heads $e^1$ of the spindles and the inner ends $d^1$ of the corresponding holders $d$ which will be moved upward and radially outward by the action of the flanges $f$ of the rings $g$, $g^1$ on the flanges $d^2$ of the holders, and all the parts are free to automatically adjust themselves without hurtful strain, as above described.

In the constructional arrangement shown, the inner ring $b$ is provided with detachable side plates $h$ and and $i$ that are rigidly fixed to opposite sides of the inner ring $b$ by bolts $k$ that extend through the ring $b$ and plates $h$ and $i$. The outer ring $c$ with its side rings $g$, $g^1$ is arranged to work between the side plates $h$ and $i$, the ring $g$ being formed in one piece with the outer ring $c$ and the ring $g^1$ being held endwise within a recess $m$ in the outer ring $c$ by the side plate $i$. As will be seen the arrangement is such as to admit of the springs $a$, holders $d$ and spindles $e$ being readily placed in position, and to inclose these parts in a practically dust tight casing. The outer ring $c$ is formed with outwardly extending annular portions $n$ and $o$ between and to which the spokes or equivalent outer portions of the wheel are secured.

The plates $h$ and $i$ may, in the case of a free wheel, as shown in Figs. 1 and 2, be of plain circular shape and take into plain circular recesses $p$ formed in the opposite sides of the outer ring $c$ by flanges $q$ thereon. When the wheel is to be adapted for use as a driving wheel instead of as a free wheel, the rings $h$ and $i$ and the recesses $p$ may be so formed as to limit the extent of relatively circumferential movement between the inner and outer rings $b$, $c$ and attached parts while allowing of the required radial movement between them.

When the wheel is adapted for use as a driving wheel, as shown in Figs. 5 and 6 the outer periphery of the plate $h$, or it may be of each plate $h$ and $i$, is made of the undulating shape shown more clearly in Fig. 5, so as to form alternately arranged lugs $r$ and recesses $s$, and is arranged to loosely engage with the correspondingly formed inner surface of the adjacent flange $q$ on the outer ring $c$.

Spring wheels embodying the present invention can be constructed in various forms and the details of construction can be variously modified without departing from the essential features of the invention.

What we claim is:—

1. In a spring wheel, inner and outer rings radially movable in relation to one another, spring holders each adapted to act at its inner and outer ends in an outward direction against the inner and outer rings respectively but disconnected therefrom, supplementary spring holders adapted to act against the inner ring and to be moved outward by the outer ring but disconnected from each ring, and springs each held between a pair of said spring holders and adapted to be compressed by inward movement of one of the holders of the pair and by outward movement of the other holder of the pair.

2. In a spring wheel, inner and outer rings radially movable in relation to one another, pairs of spring holders between said rings, one of the holders of each pair extending through the inner ring and adapted to act at its outer end against the inner surface of the outer ring and at its inner end against the inner surface of the inner ring but disconnected from each ring, and the other holder of each pair being adapted to act against the inner ring and to be moved outward by the outer ring and also disconnected from each ring, and coiled springs each held between a pair of said holders.

3. In a spring wheel, inner and outer rings radially movable in relation to one another, spindles each extending radially through the inner ring and provided at its outer end with a head adapted to bear and slide against the inner surface of the outer ring, and at its inner end with a stop adapted to bear against the inner surface of the inner ring, spring holders adapted to carry the inner ends of coiled springs and each arranged to surround one of said spindles, to bear against the inner ring, and to be moved outward by outward movement of the outer ring but capable of turning in a circular direction relatively to said outer ring, and coiled springs each arranged between the head of one of said spindles and the inner end of the corresponding spring holder.

4. In a spring wheel, the combination of inner and outer rings radially movable relatively to one another, spindles extending through the inner ring and having enlarged inner and outer ends adapted to bear against the inner and outer surfaces of the inner and outer rings respectively, recessed spring holders arranged between said rings and adapted to bear against the inner ring and to be moved outward by the outer ring but disconnected from such outer ring to allow of said ring moving radially inward and in a circumferential direction relatively to said spring holders, and coiled springs each surrounding one of said spindles and held between the outer enlarged end thereof and the inner end of the corresponding spring holder.

5. In a spring wheel, the combination of inner and outer rings that are movable in radial and circumferential directions relatively to one another, the outer ring carrying lateral projections, spindles extending through the inner ring and having enlarged inner and outer ends adapted to bear against the inner and outer surfaces of the inner and outer rings respectively, recessed spring holders arranged between said rings and adapted to bear against the inner ring and to engage with the lateral projections carried by the outer ring, said holders and projections being arranged to co-act with each other so as to allow of circumferential movement between them, of inward movement of the projections independent of said holders and to cause outward movement of said projections to cause outward movement of the corresponding holders, and coiled springs each held between the outer end of one of said spindles and the inner end of the corresponding spring holder.

6. In a spring wheel, inner and outer rings radially movable in relation to one another spring holders each adapted to act at its inner and outer ends in an outward direction against the inner and outer rings respectively but disconnected therefrom, supplementary spring holders adapted to act against the inner ring and to be moved outward by the outer ring but disconnected from each ring, springs each held between a pair of said spring holders and to be compressed by inward movement of one of the holders of the pair and by outward movement of the other holder of the pair and driving means adapted to rotate the outer ring and allow of radial movement thereof relatively to the inner ring.

7. In a spring wheel, inner and outer rings radially movable in relation to one another, spring holders each adapted to act at its inner and outer ends in an outward direction against the inner and outer rings respectively but disconnected therefrom, supplementary spring holders adapted to act against the inner ring and to be moved outward by the outer ring but disconnected from each ring, springs each held between a pair of said spring holders and to be compressed by inward movement of one of the holders of the pair and by outward movement of the other holder of the pair and driving means connected to said inner ring and loosely engaging said outer ring and adapted to rotate the same but allow of limited radial and circumferential motions between said rings.

8. In a spring wheel, inner and outer rings movable relatively to one another in a radial and circumferential direction, radially arranged spindles each of which is adapted to bear at its inner and outer ends against the inner surfaces of the inner and outer rings respectively and to extend through the inner ring, hollow cylindrical spring holders arranged between said rings but disconnected therefrom and adapted to bear against the inner ring and to be moved outward by the outer ring and springs each of which bears at one end against the outer end of one of said bolts and at the other end against the inner end of one of said holders.

9. In a spring wheel, inner and outer rings movable relatively to one another in a radial and circumferential direction, radially arranged spindles each of which is adapted to bear at its inner and outer ends against the inner surfaces of the inner and outer rings respectively and to extend through the inner ring, hollow cylindrical spring holders each extending around one of said spindles, each spring holder bearing at its inner end against the outer surface of the inner ring and having lateral flanges at its outer end, lateral flanges connected with the outer ring and adapted to co-operate with the flanges on said holders, and coiled springs each of which bears at one end against the outer end of the corresponding spindle and is held at its inner end in one of said spring holders.

10. In a spring wheel, inner and outer rings movable relatively to one another in a radial and circumferential direction, radially arranged spindles each of which is adapted to bear at its inner and outer ends against the inner surfaces of the inner and outer rings respectively and to extend through the inner ring, hollow cylindrical spring holders each extending around one of said spindles, each spring holder bearing at its inner end against the outer surface of the inner ring and having lateral flanges at its outer end, lateral flanges connected with the outer ring, and adapted to co-operate with the flanges on said holders, coiled springs each of which bears at one end against the outer end of the corresponding spindle and is held at its inner end in one of said spring holders, and driving means whereby power communicated to the wheel hub and inner ring will be transmitted to the outer ring and allow of relative radial and circumferential movement of the two rings.

11. In a spring wheel, inner and outer rings movable relatively to one another in a radial and circumferential direction radially arranged spindles each of which is adapted to bear at its inner and outer ends against the inner surfaces of the inner and outer rings respectively and to extend through the inner ring, hollow cylindrical spring holders each extending around one of said spindles, each spring holder bearing at its inner end against the outer surface of the inner ring and having lateral flanges at its outer end, lateral flanges connected with the outer ring and adapted to co-operate with the flanges on said holders, coiled springs each of which bears at one end against the outer end of the corresponding spindle and is held at its inner end in one of said spring holders, a driving plate connected to the inner ring and formed with outwardly extending lugs or projections, and a driving part connected to the outer ring and having corresponding recesses wherein the lugs or projections on the first mentioned driving plate loosely engage.

12. A spring hub comprising an inner ring, side plates between which said ring is held, an outer ring having inwardly extending side rings arranged to slide between said side plates, and formed with inner lateral extensions, spindles extending radially through said inner ring and having enlarged inner and outer ends adapted to act against the inner surfaces of the inner and outer rings respectively, recessed spring holders arranged to bear at their inner ends against the inner ring and provided at their outer ends with lateral flanges arranged outside the lateral flanges on the side rings and to co-operate therewith as set forth, and coiled springs each surrounding one of said spindles and held between the outer end thereof and the inner end of the corresponding spring holder.

13. A spring hub comprising an inner ring, side plates between which said ring is held, an outer ring having inwardly extending side rings arranged to slide between said side plates and each provided at its inner side with an annular lateral flange, spindles extending radially through said inner ring, and having enlarged inner and outer ends adapted to act against the inner surfaces of the inner and outer rings respectively, recessed spring holders arranged to bear at their inner ends against the inner ring and provided at their outer ends with lateral flanges arranged outside the annular lateral flanges on the side rings and to co-operate therewith as set forth, and coiled springs each surrounding one of said spindles and held between the outer end thereof and the inner end of the corresponding spring holder.

14. A spring hub comprising an inner ring, side plates between which said ring is held, an outer ring having inwardly extending side rings arranged to slide between said side plates and formed with inner lateral extensions, one of said plates being formed of a polygonal shape and loosely engaging a correspondingly shaped recess in the adjacent side of the outer ring, spindles extending radially through said inner ring and having enlarged inner and outer ends adapted to act against the inner surfaces of the inner and outer rings respectively, recessed spring holders arranged to bear at their inner ends against the inner ring and provided at their outer ends with lateral flanges arranged outside the lateral flanges on the side rings and to co-operate therewith as set forth, and coiled springs each surrounding one of said spindles and held between the outer end thereof and the inner end of the corresponding spring holder.

Signed at London, England, this twenty-fifth day of January, 1906.

LOFTUS JACKSON.
    JOHN JACKSON.

Witnesses:
 CLAUD SCOTT,
 WILLIAM SKIDMORE.